United States Patent [19]
Grochowski

[11] Patent Number: 6,115,807
[45] Date of Patent: *Sep. 5, 2000

[54] STATIC INSTRUCTION DECODER UTILIZING A CIRCULAR QUEUE TO DECODE INSTRUCTIONS AND SELECT INSTRUCTIONS TO BE ISSUED

[75] Inventor: Edward T. Grochowski, San Jose, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/994,516

[22] Filed: Dec. 19, 1997

[51] Int. Cl.$^7$ .................................................... G06F 9/30
[52] U.S. Cl. ........................ 712/212; 712/215; 712/204
[58] Field of Search ................................ 712/212, 213, 712/208, 215, 204, 207

[56] References Cited

U.S. PATENT DOCUMENTS

| | | |
|---|---|---|
| 4,502,111 | 2/1985 | Riffe et al. ............................. 712/204 |
| 4,720,779 | 1/1988 | Raynard et al. ........................ 712/215 |
| 5,497,496 | 3/1996 | Ando ........................................ 712/23 |
| 5,742,783 | 4/1998 | Azmoodeh et al. .................... 712/215 |
| 5,758,114 | 5/1998 | Johnson et al. ......................... 712/204 |
| 5,941,980 | 8/1999 | Shang et al. ............................ 712/215 |

*Primary Examiner*—Richard L. Ellis
*Attorney, Agent, or Firm*—Blakely, Sokoloff, Taylor & Zafman, LLP

[57] ABSTRACT

The invention, in one embodiment, is a static instruction decoder including a plurality of instruction inputs, a circular instruction queue, and an instruction rotator. The circular instruction queue is capable of receiving instructions from the instruction inputs, statically decoding the received instructions, indicating how many of the decoded instructions may issue in a next clock cycle, and outputting the decoded instructions in the next clock cycle, the number of instructions output being the number indicated. The instruction rotator is indexed by the indication of the circular instruction queue and points to the first instruction to issue in the next clock cycle.

41 Claims, 5 Drawing Sheets

STATIC INSTRUCTION DECODER UTILIZING A CIRCULAR QUEUE TO DECODE INSTRUCTIONS AND SELECT INSTRUCTIONS TO BE ISSUED

BACKGROUND OF THE INVENTION

1. Field of the Invention

This invention relates generally to processors, and more particularly, to instruction decode in a superscalar processor.

2. Description of the Related Art

Computers and many other types of machines are engineered around a "processor." A processor is an integrated circuit that executes programmed instructions on data stored in the machine's memory. There are many types of processors and there are several ways to categorize them. For instance, one may categorize processors by their intended application, such as microprocessors, digital signal processors ("DSPs"), or controllers. One may also categorize processors by the complexity of their instruction sets, such as reduced instruction set computing ("RISC") processors and complex instruction set computing ("CISC") processors. The operational characteristics on which these categorizations are based define a processor and are collectively referred to as the processor's architecture. More particularly, an architecture is a specification defining the interface between the processor's hardware and the processor's software.

One aspect of a processor's architecture is whether it executes instructions sequentially or out of order. Historically, processors executed one instruction at a time in a sequence. A program written in a high level language was compiled into object code consisting of many individual instructions for handling data. The instructions might tell the processor to load or store certain data from memory, to move data from one location to another, or any one of a number of data manipulations. The instructions would be fetched from memory, decoded, and executed in the sequence in which they were stored. This is known as the "sequential programming model." Out of order execution involves executing instructions in some order different from the order in which they are found in the program, i.e., out of order or non-sequentially.

A second aspect of a processor's architecture is whether it "pipelines" instructions. The processor fetches instructions from memory and feeds them into one end of the pipeline. The pipeline is made of several "stages," each stage performing some function necessary or desirable to process instructions before passing the instruction to the next stage. For instance, one stage might fetch an instruction, the next stage might decode the fetched instruction, and the next stage might execute the decoded instruction. Each stage of the pipeline typically moves the instruction closer to completion.

Some advanced processor pipelines process selected instructions "speculatively." Exemplary speculative execution techniques include, but are not limited to, advanced loads, branch prediction, and predicate prediction. Speculative execution means that instructions are fetched and executed before resolving pertinent control dependencies. Speculative execution requires a prediction as to what instructions are needed depending on whether a branch is taken, executing fetched instructions, and then verifying the execution and prediction. The pipeline executes a series of instructions and, in the course of doing so, makes certain predictions about how control dependencies will be resolved. For instance, if two instructions are to be alternatively executed depending on the value of some quantity, then the pipeline has to guess what that value will be or which instruction will be executed. The pipeline then predicts the next instruction to be executed and fetches the predicted instruction before the previous instruction is actually executed.

A pipeline therefore has the tremendous advantage that, while one part of the pipeline is working on a first instruction, a second part of the pipeline can be working on a second instruction. Thus, more than one instruction can be processed at a time, thereby increasing the rate at which instructions can be executed in a given time period. This, in turn, increases the processor throughput.

A third aspect of a processor's architecture is whether the processor is "superscalar." Historically, processors executed only one instruction at a time, i.e., in any given clock cycle. Such a processor is called a "scalar" processor. More recently, "superscalar" processors have been designed that execute more than one instruction at a time. More technically, a scalar processor executes one instruction per clock cycle whereas a superscalar processor executes more than one instruction per clock cycle.

Superscalar processors typically use a pipeline as described above where different stages of a pipeline work on different instructions at any given time. Not only do superscalar processors work on several different instructions at a time, but each stage of a superscalar pipeline processes more than one instruction each clock cycle. A superscalar pipeline usually includes one or more stages having several execution units executing instructions in parallel. Each execution unit reads from and writes to storage through "functional unit ports." Thus, a pipeline including N execution units may be described as an N-way pipeline having N functional unit processors.

One of the pipeline's challenges is to determine how many instructions can be executed at any given time. Some instructions require greater resources and/or more time to execute than do others. Thus, a pipeline might be able to handle twice as many instructions that are half as hard as other instructions. The trick is to know which instructions are coming down the pipeline so that the pipeline can utilize its resources efficiently. This trick is important because its resolution effectively guards the gate to the pipeline, ensuring that neither too many nor too few instructions enter the pipeline at any given time.

The question of how many instructions can be executed at any given time is particularly important in at least two types of architectures. The first type is the superscalar architecture in which a variable number of fixed length instructions may be issued into the pipeline. The second type is a scalar architecture having variable length instructions. However, there may be other contexts in which the question arises. The following disclosure shall, for the sake of clarity, be presented in the context of a superscalar architecture employing fixed length instructions but capable of issuing a variable number of those instructions depending upon availability of pipeline resources. Nevertheless, the invention is not so limited.

Superscalar processors usually fetch, decode, and issue instructions in a "rotator loop." The loop begins when instructions are fetched and loaded into a queue for the decoder. A pointer points to the next instruction to be decoded. The decoder then decodes the instruction, issues the decoded instruction, and updates the pointer to the next instruction. If the decoder comes to the end of the queue, it rotates around to the beginning of the queue. This completes the loop.

If another instruction may issue, the loop is repeated. The loop may be repeated several time each clock cycle depending on how many of the instructions may issue. However, the fetch, decode, and issuance for every issued instruction must be completed in a single clock cycle so that all issued instructions are issued into the next stage at the next clock cycle. At the next clock cycle, the number of instructions determined by the decoder issue into the pipeline. The pointer is then rotated to point to the next instruction in the queue for the next clock cycle.

A conventional decoder must therefore receive the queued instructions, decode them, make the determination of how many will issue, and update the pointer in a single clock cycle. This timing constraint is critically important since, by definition, the decoder determines how many bundles will issue in the next clock cycle. The slower the decoder performs its function, the slower the clock cycle must be.

The demand for faster, more powerful processors continually outstrips present technology. The demand pressures all aspects of processor architecture design to become faster, including the decoding and issuance of bundled instructions. Thus, there is a need for a new technique to decode and determine how many bundles of instructions might issue for execution in a pipelined processor.

The present invention is directed to overcoming, or at least reducing the effects of, one or more of the problems set forth above.

SUMMARY OF THE INVENTION

The invention, in one embodiment, is a static instruction decoder including a plurality of instruction inputs, a circular instruction queue, and an instruction rotator. The circular instruction queue is capable of receiving instructions from the instruction inputs, statically decoding the received instructions, indicating how many of the decoded instructions may issue in a next clock cycle, and outputting the decoded instructions in the next clock cycle, the number of instructions output being the number indicated. The instruction rotator is indexed by the indication of the circular instruction queue and points to the first instruction to issue in the next clock cycle.

BRIEF DESCRIPTION OF THE DRAWINGS

Other objects and advantages of the invention will become apparent upon reading the following detailed description and upon reference to the drawings in which.

Figure 1:
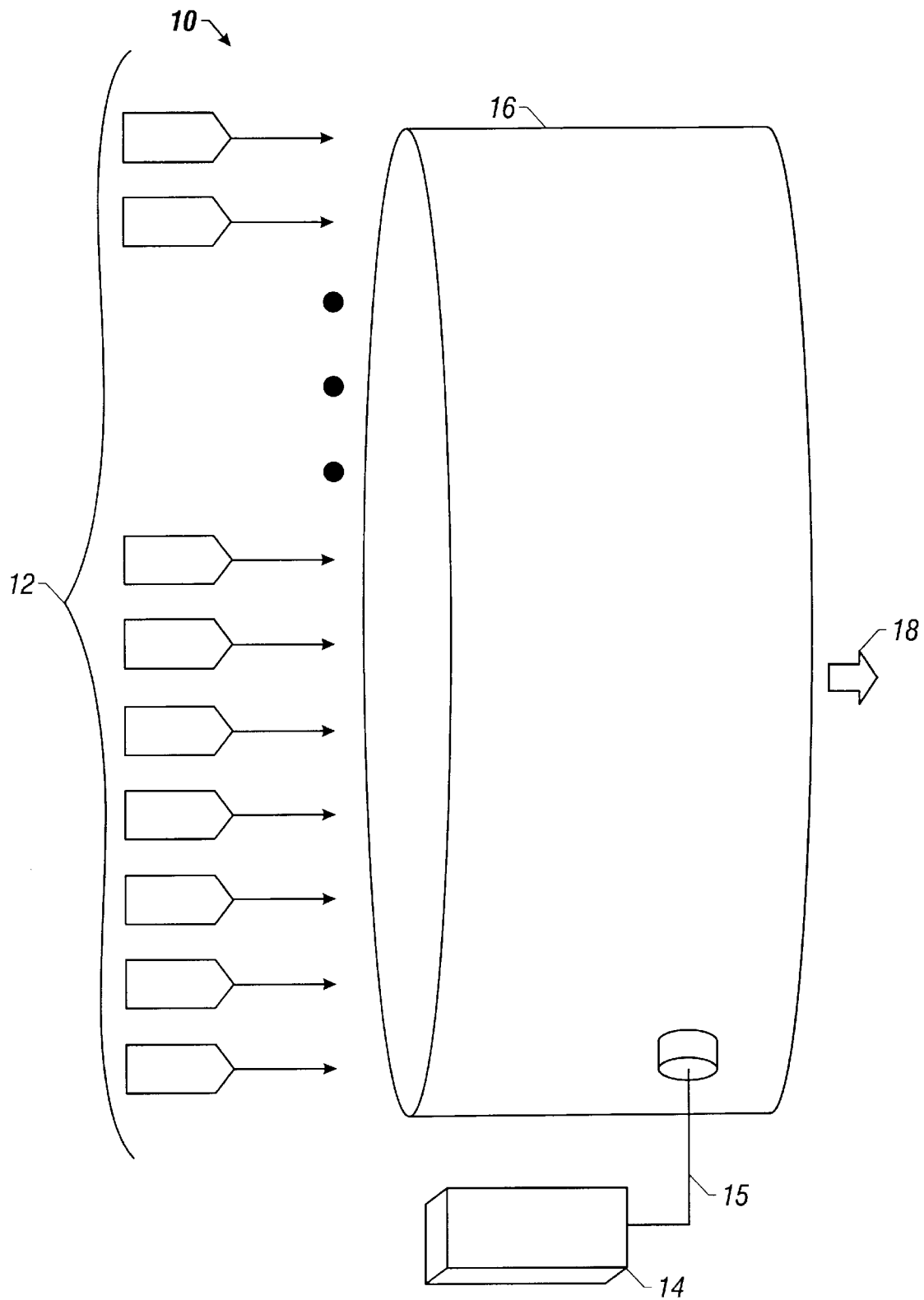
FIG. 1 conceptually illustrates a static instruction decoder constructed and operated in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would nevertheless be a routine undertaking for those of ordinary skill in the art having the benefit of this disclosure.

FIG. 1 conceptually illustrates a static instruction decoder 10 constructed and operated in accordance with the present invention. The static instruction decoder 10 generally comprises a plurality of instruction inputs 12, an instruction rotator 14, and a circular instruction queue 16. Instructions are fetched from memory to the instruction inputs 12 in any manner known to the art. The precise number of instruction inputs 12 is implementation specific and, therefore, not material to the practice of the invention. Hereafter, the number of instruction inputs 12 shall be referred to as N. In one particular embodiment, there are sixty-four instruction inputs 12.

The circular instruction queue 16 is capable of receiving the fetched instructions from the instruction inputs 12, statically decoding the received instructions, indicating how many of the decoded instructions may issue in a next clock cycle, and outputting the decoded instructions in the next clock cycle. The number of instructions output as shown by the arrow 18 is the number indicated to the instruction rotator 14. The instruction rotator 14 is indexed by the indication of the circular instruction queue 16 received over the line 15 to the first instruction to issue in the next clock cycle.

Figure 2:
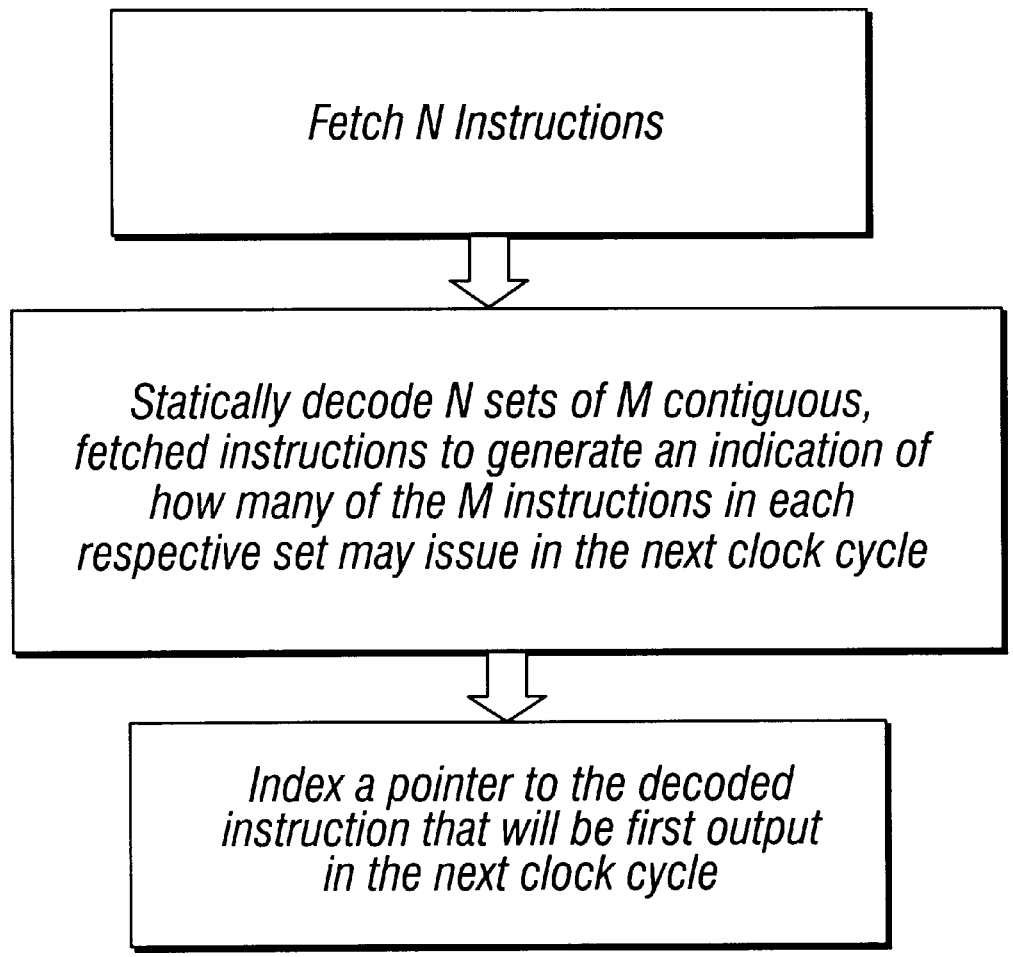
FIG. 2 illustrates one embodiment of a method practiced in accordance with the present invention.

More particularly, as shown in FIG. 2, the static instruction decoder 10 may be used to determine how many instructions may issue in the next clock cycle of a pipeline (not shown) and to issue those instructions. The method begins by fetching instructions from memory onto the N instruction inputs 12. Next, the static instruction decoder 10 statically decodes N sets of M contiguous, fetched instructions to generate an indication of how many of the M instructions in each respective set may issue in the next clock cycle. Finally, a pointer (not shown) from the instruction rotator 14 over the line 15 is indexed to the decoded instruction that will be first output in the next clock cycle.

The static instruction decoder 10 may be used in at least two types of pipelines. The first pipeline type is a superscalar processor pipeline (not shown) issuing a variable number of fixed length instructions per cycle. One particular embodiment of this pipeline type may implement the Intel IA-32 architecture while another may implement the Intel IA-64 architecture. The second pipeline type is a scalar processor pipeline (not shown) issuing variable length instructions at a rate of one per clock cycle. However, the invention is not necessarily so limited.

Figure 3:
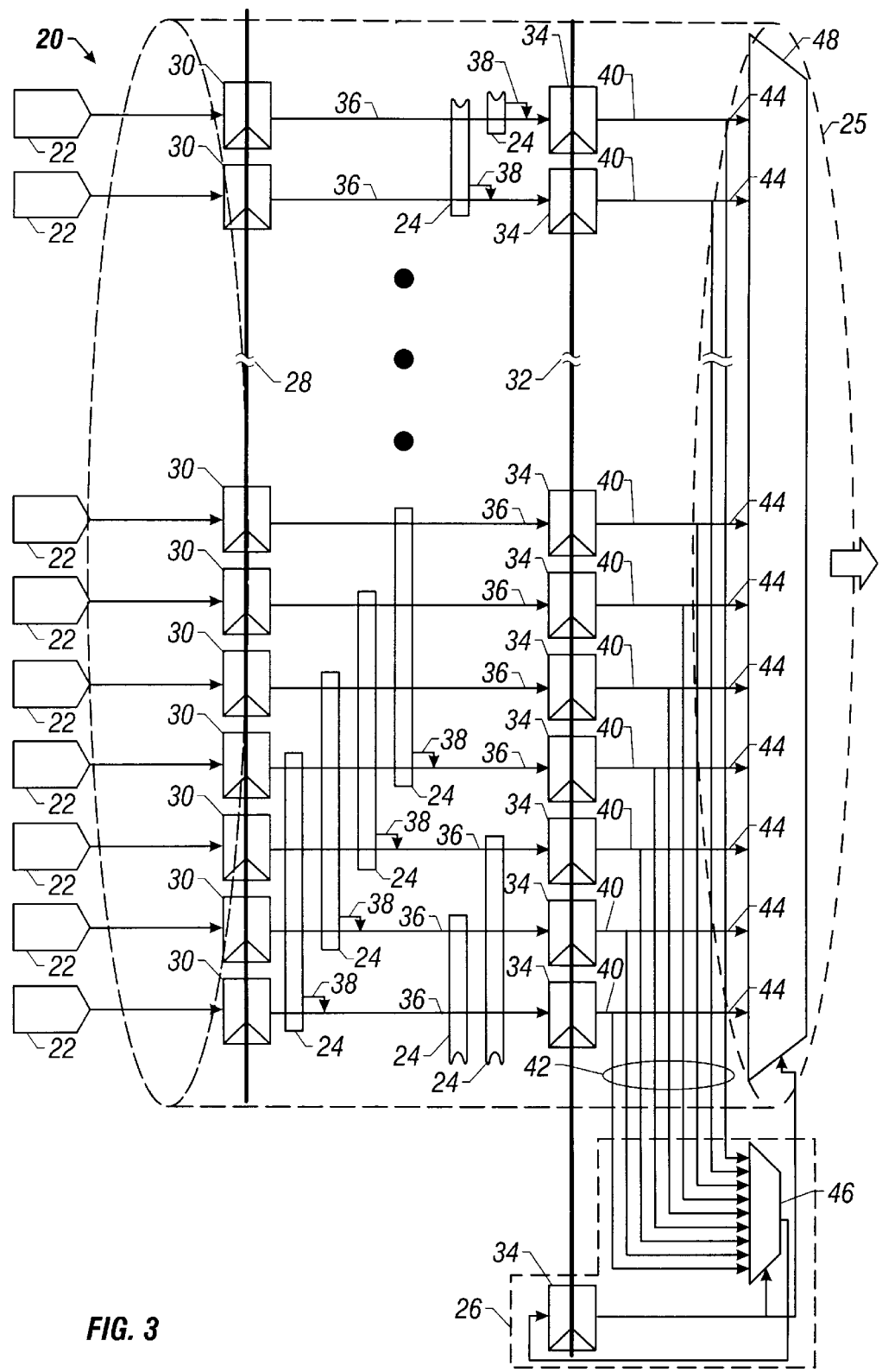
FIG. 3 depicts a particular embodiment of the decoder in FIG. 1.

FIG. 3 illustrates one particular embodiment 20 of the static instruction decoder 10 in FIG. 1. The static instruction decoder 20 generally comprises a plurality of instruction inputs 22, a circular instruction queue 25, and an instruction rotator 26. This particular embodiment 20 statically decodes instructions for use in a superscalar pipeline that may issue a variable number of fixed length instructions in each clock cycle. As in the static instruction decoder 10 of FIG. 1, raw, undecoded instructions are fetched from memory, queued in the instruction inputs 22, processed in the circular instruction queue 25, and the instruction rotator 26 is updated.

The circular instruction queue 25 includes at least one static decoder 24 for each of the instruction inputs 22, as discussed more fully below. The circular instruction queue 25 includes at least N static decoders 24 flanked by a first array 28 of N flip-flops 30 and a second array 32 of flip-flops 34. The flip-flops 30 latch instructions into the circular instruction queue 25 from the instruction inputs 22 in accord with conventional synchronous design principles. The flip-flops 34 conventionally latch out the indications of the static decoders 24 to the instruction rotator 26 and the decoded instructions to the multiplexer 48.

In any given clock cycle, a predetermined number of flip-flops 30 are enabled using any queue mechanism head pointer technique (not shown) known to the art. Thus, instructions are scheduled into the circular instruction queue 25 via the instruction inputs 22. The number of flip-flops 30 enabled per clock cycle should equal the maximum number of instructions that may issue in any clock cycle and is therefore implementation specific.

There is at least one flip-flop 30 and 34 in each of the arrays 28 and 32 for each static decoder 24. The array 28 in the embodiment of FIG. 2 represents the end of one stage of a pipeline and the array 32 represents the beginning of another stage in the pipeline. Thus, the static instruction decoder 20 is a circular queue bridging two stages.

Each of the static decoders 24 is operably coupled to sample several contiguous instruction inputs 22. The number of sampled instruction inputs 22 for each static decoder 24 should be the maximum number of instructions that may issue in a single clock cycle. The maximum number of instructions that may issue is a feature of the architecture and, thus, is implementation specific. In the embodiment of FIG. 3, the static decoders 24 are four instructions wide, but the precise number is not important to the practice of the invention. Hereafter, the instruction width shall be referred to as M. The instruction width M may be selected such that the number N of instruction inputs 22 is an integer multiple of M, although this also is not necessary to the practice of the invention.

Each static decoder 24 examines the instructions on the M instruction inputs 22 with which it is operably connected. The top M-1 static decoders 24 wrap around to include the bottom M-1 instruction inputs 22. Thus, the circular nature of the instruction queue 25. Each of the static decoders 24 decodes the instructions on the M instruction inputs to which it is operably connected. Each static decoder 24 assumes that the instruction in the first instruction input 22 to which it is operably connected will be the next instruction to issue and determines how many of the next M-1 instructions may issue with it. Each static decoder 24 then outputs an indication of that determination along with the decoded instructions.

The number of instructions that may actually issue is a function of several implementation specific features. Exemplary factors include the complexity of the instructions and the available machine resources. For instance, if the instructions include more loads and stores than the pipeline has resources to process, then at least some of the instructions do not issue. Each of these considerations is implementation specific.

The results of the static decode are latched out of the circular instruction queue by the flip-flops 34 via the multiplexer 48. Each static decoder 24 outputs in parallel each of the M instructions decoded thereby. Each static decoder 24 also outputs in parallel several bits representing its indication of how many of the M instructions may issue in the next clock cycle. Thus, each line 36 represents several leads in parallel, the number of leads being sufficient to transmit in parallel the instructions decoded by the static decoder 24 to which it is operably coupled by the coupler 38 and the corresponding indication bits.

The flip-flops 34 receive the output of the static decoders 24 via the lines 36. When enabled, the flip-flops 34 output the decoded instructions and indication bits on the lines 40. The lines 40, like the lines 36, comprise enough leads to transmit the decoded instructions and indication bits in parallel. However, the indication bits are stripped off and transmitted over the lines 42 to the instruction rotator 26. The lines 44 therefore transmit only the decoded instructions to the multiplexer 48. The lines 42 and 44 also transmit the indication bits and the decoded instructions, respectively, in parallel.

The instruction rotator 26 receives the indication of how many instructions may issue in the next clock cycle from the static decoders 24. More particularly, the instruction rotator 26 includes an index generator 46, which is a multiplexer in the particular embodiment illustrated. The index generator 46 generates a tail pointer to the static decoder 24 of the next instruction to issue. The pointer is indexed by the output of an index generator 46, which also receives the outputs of all the static decoders 24. At the next clock cycle, the instruction rotator 26 reads the indication from the static decoder 24 indicated by the pointer to the next instruction indexed by the output of the static decoders 24. The instruction rotator 26 also updates the pointer position with the output of the index generator 46 to point to the output of the static decoder 24 of the next instruction to issue.

Thus, just before a clock cycle begins, the particular static decoder 24 whose first instruction will next issue has output on the respective line 36. The output of the particular static decoder 24 includes M decoded instructions and a plurality of indication bits. The pointer generated by the instruction rotator 26 points to the particular static decoder and is transmitted to the index generator 46 and the multiplexer 48. Although not shown, the pointer is also used to enable the flip-flops 34 in groups of four.

At the next clock cycle, the flip-flop 34 enabled by the pointer latches the output of the particular static decoder 24 to the multiplexer 48 and the instruction rotator 26. More precisely, the decoded instructions are latched out to the multiplexer 48 and the indication bits are latched out to the instruction rotator 26. The multiplexer 48 outputs the decoded instructions from the circular instruction queue 25. The instruction rotator 26 updates the pointer. The process is then repeated for the next clock cycle.

Figure 4:
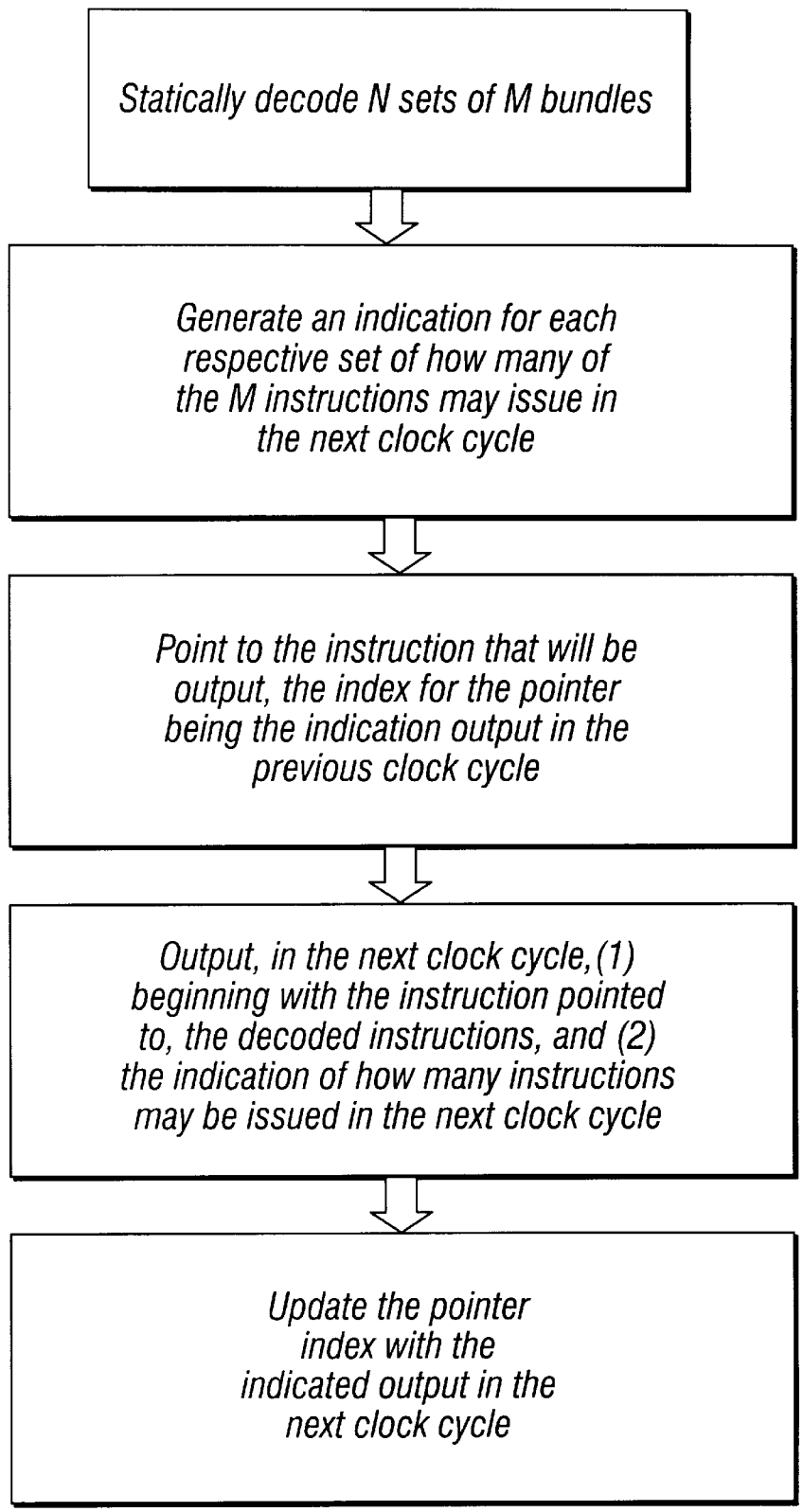
FIG. 4 illustrates a method such as may be practiced in accordance with the present invention.

FIG. 4 illustrates one embodiment of a method for practicing the invention. The method of FIG. 4 shall be discussed relative to the apparatus 50 of FIG. 5. The apparatus 50 is one particular embodiment of the apparatus 20 in FIG. 3 wherein N=5 and M=3. Thus, there are five instruction inputs 51–55, five static decoders 61–65, and the static decoders 64 and 65 wrap around to the instruction inputs 51 and 52. The discussion of FIGS. 4–5 assumes that the processor (not shown) of which the apparatus 50 is a part is under operation and that instructions are already in the pipeline (not shown).

Figure 5:
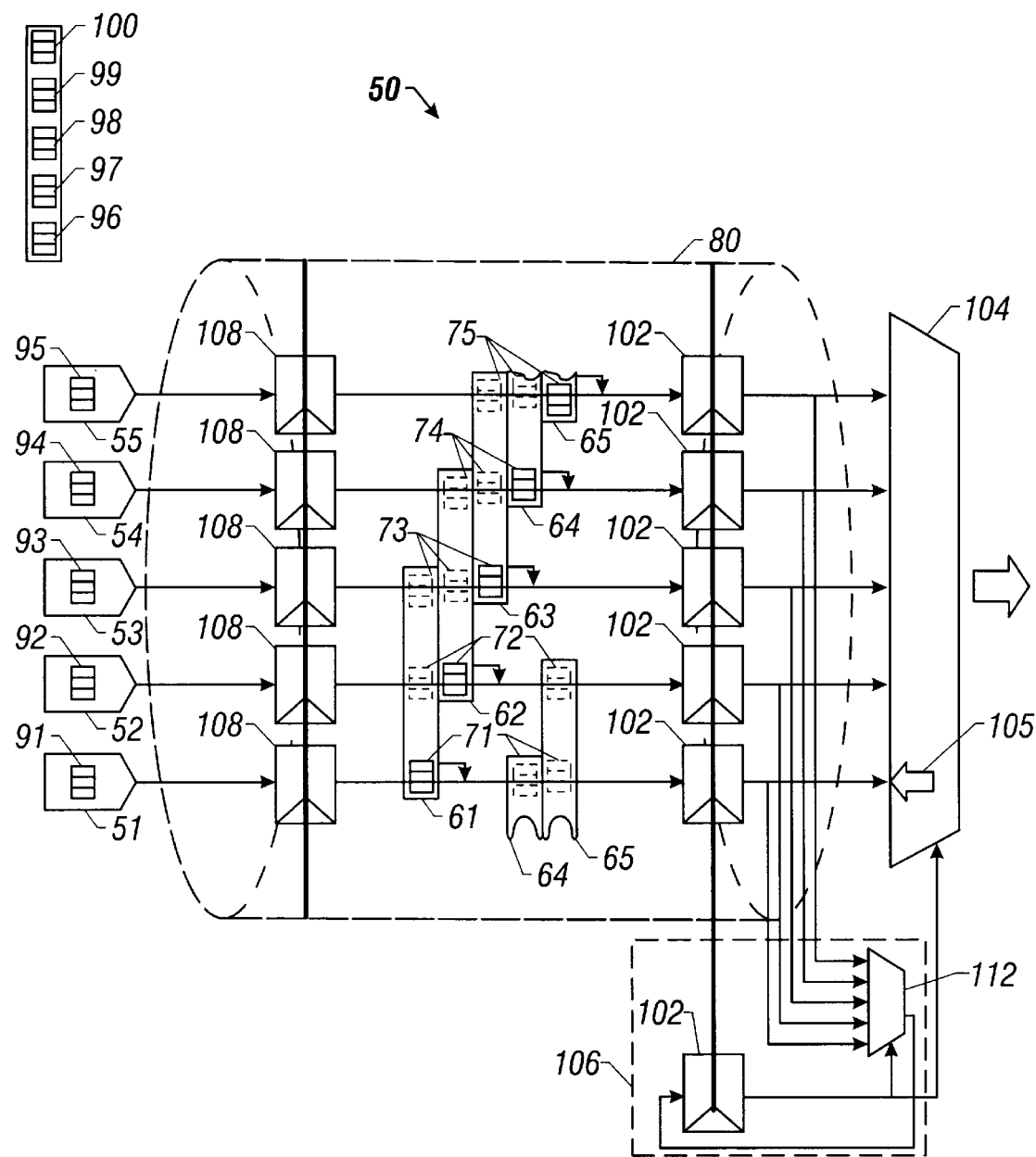
FIG. 5 depicts another embodiment of the decoder in FIG. 1 to help illustrate the method in FIG. 4.

One embodiment of the particular static instruction decoder 50 in FIG. 5 is part of a pipeline implementing the Intel IA-64 architecture. The IA-64 architecture processes instructions through the pipeline (not shown) in "bundles." Bundles are grouped instructions accompanied by a template of control information. In one particular embodiment, a bundle includes three instructions and the template. The control information in the template may contain, for instance, a stop bit that will stop issuance of the next bundle until the next clock cycle after the bundle in which it is found.

The static instruction decoder 50 of FIG. 5 is illustrated in operation. Bundles 71–75 have already been clocked into the circular instruction queue 80, bundles 91–95 are queued in the instruction inputs 51–55, respectively, and bundles 96–100 are buffered awaiting their turn to be queued. The numbers assigned to the bundles are for reference purposes only and do not connote any type of ordering. The decoders 61–65 have statically decoded the bundles 71–75, respectively, and the next two bundles thereafter, respectively. Thus, for example, the decoder 61 has decoded the bundles 71–73, and the decoder 62 has decoded the bundles 72–74. Each of the bundles 71–75 is statically decoded by three different ones of the static decoders 61–65. For example, the bundle 73 is statically decoded by each of the decoders 61–63.

The pointer of the instruction rotator 105 is conceptually represented by the arrow 105 and is indexed to the instruction input 51. The index is determined by the index generator circuit 112 (shown as a multiplexer) on the results latched out of the circular instruction queue 80. More particularly, the indication output by the static decoder whose bundle first issued in the previous clock cycle was input to the multiplexer 112 to update the pointer to the instruction input 51. Thus, the bundle 71 decoded by the static decoder 61 shall be the first bundle to issue in the next clock cycle.

At the next clock cycle, the determination of each of the static decoders 61–65 is latched out by the flip-flops 102. Because the pointer 105 is indexed to the instruction input 51, multiplexer 104 outputs only the determination of the static decoder 61. The outputs of the decoders 62–65 are ignored. The instruction rotator 106 then generates a new index and the pointer 105 is updated to point to the instruction input 54. In the meantime, assuming three bundles can issue in the next clock cycle, bundles 91–93 are latched into the circular instruction queue 80 by the flip-flops 108. Bundles 96–98 then are placed in the instruction inputs 51–53, respectively. In the next clock cycle, the process repeats.

As with the instructions in the embodiment of FIG. 2, the number of bundles that may actually issue is a function of several implementation specific features. In one particular embodiment employing an IA-64 architecture, the number is a function of (1) the presence of stop bits; (2) the number of instructions in each syllable of each bundle; and (3) the available machine resources. For instance, if the bundles include more loads and stores than the pipeline has resources to process, then the bundle does not issue. Too, if a bundle group includes conditional branches, the conditional branches need to occur in the latter syllables of the bundle group. In one particular embodiment, the static instruction decoder 50 can force stop bits to ensure that these types of constraints are met. Each of these considerations is implementation specific.

Thus, as shown in FIG. 5, the invention in one embodiment is a method for determining how many bundles of instructions may issue in the next clock cycle. The method generally comprises statically decoding N sets of M bundles to generate an indication for each respective set of how many of the M bundles the set may issue in the next clock cycle. Next, the pointer 105 of instruction rotator 106 points to the indication that will be output, the index for the pointer being the indication output in the current clock cycle. The multiplexer 104 then outputs in the next clock cycle the indication to which the pointer 105 is indexed. Finally, the pointer index is updated with the indication output in the next clock cycle.

The invention therefore simplifies the operation and function of the instruction rotator by statically decoding sets of bundles in an external circular instruction queue. Thus, the instruction rotator need only determine which indication should be output and then output it. In embodiments utilizing an index generating circuit, even that function may be delegated from the instruction rotator. The invention therefore accelerates the operation of the instruction rotator by delegating certain of its functions to the circular instruction queue and, in some embodiments, the index generator circuit.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. For example, the static instruction decoder disclosed above may also be used in the back end of a processor pipeline for determining various types of dependencies in addition to the uses disclosed above. It is therefore evident that the particular embodiments disclosed above may be altered or modified and all such variations are considered within the scope and spirit of the invention. Accordingly, the protection sought herein is as set forth in the claims below.

What is claimed is:

1. A static instruction decoder, comprising:
a plurality of instruction inputs;
a circular instruction queue including N plurality of decoders, each coupled to receive M contiguous instruction inputs, in which the decoders wrap around in a circular arrangement coupled to the instruction inputs; and
an instruction rotator coupled to the circular instruction queue and indexed by an indication of the circular instruction queue to point to an instruction first to issue in the next clock cycle.

2. The static instruction decoder of claim 1 where M is the maximum number of instructions that may issue in the next clock cycle.

3. The static instruction decoder of claim 2 where N is an integer multiple of M.

4. The static instruction decoder of claim 1 wherein the instruction rotator includes an index generator coupled to the decoders to select the instruction which will issue in the next clock cycle.

5. The static instruction decoder of claim 1 implemented in a superscalar pipeline.

6. The static instruction decoder of claim 5 wherein the superscalar pipeline issues a variable number of fixed length instructions in the next clock cycle.

7. The static instruction decoder of claim 1 implemented in a scalar pipeline.

8. The static instruction decoder of claim 7 wherein the scalar pipeline issues a fixed number of variable length instructions in the next clock cycle.

9. The static instruction decoder of claim 1 wherein the indication of the circular instruction queue is obtained from a plurality of bits generated from the decoders while statically decoding the instructions.

10. An apparatus comprising:

N instruction inputs;

N static decoders coupled to the N instruction inputs, wherein each of the N static decoders is coupled to receive M contiguous instruction inputs and in which the static decoders wrap around in a circular arrangement to operate as a circular instruction queue when coupled to the instruction inputs; and an instruction rotator coupled to the static decoders to point to an instruction that will first issue in the next clock cycle, the instruction rotator being indexed by outputs of the static decoders.

11. The apparatus of claim 10 where N is an integer multiple of M.

12. The apparatus of claim 10 wherein the instruction rotator includes an index generator coupled to the static decoders for indexing the outputs of the static decoders.

13. The apparatus of claim 10 implemented in a superscalar pipeline.

14. The apparatus of claim 13 wherein the superscalar pipeline issues a variable number of fixed length instructions in the next clock cycle.

15. The apparatus of claim 10 implemented in a scalar pipeline.

16. The apparatus of claim 15 wherein the scalar pipeline issues a fixed number of variable length instructions in the next clock cycle.

17. The apparatus of claim 11 wherein the indication of the circular instruction queue is obtained from a plurality of bits generated from the static decoders while decoding the instructions.

18. A static instruction decoder comprising:

N instruction inputs;

N static decoders, each coupled to receive M instruction inputs, in which the static decoders wrap around in a circular arrangement to operate as a circular instruction queue to decode instructions coupled to the instruction inputs and each indicating a number of instructions that can issue in a next clock cycle; and an instruction rotator coupled to the static decoders for generating a pointer to select a set of instructions first to issue in the next clock cycle.

19. The static instruction decoder of claim 18 where N is an integer multiple of M.

20. The static instruction decoder of claim 18 wherein the instruction rotator includes an index generator coupled to the static decoders for indexing the outputs of the static decoders.

21. The static instruction decoder of claim 18 implemented in a superscalar pipeline.

22. The static instruction decoder of claim 21 wherein the superscalar pipeline issues a variable number of fixed length instruction in the next clock cycle.

23. The static instruction decoder of claim 18 implemented in a scalar pipeline.

24. The static instruction decoder of claim 23 wherein the scalar pipeline issues a fixed number of variable length instructions in the next clock cycle.

25. The static instruction decoder of claim 18 wherein the indication of the circular instruction queue is obtained from a plurality of bits generated from the static decoders while decoding the instructions.

26. A method for determining instructions to issue in a next clock cycle comprising:

decoding statically N sets of instructions, each set including M instructions;

generating an indication for each representative set of how many of the M instructions can issue in the next clock cycle;

pointing to an instruction that will first issue in the next clock cycle by use of a pointer, an index for the pointer being an indication output in a previous clock cycle;

outputting in the next clock cycle decoded instructions beginning with the instruction pointed to; and updating the pointer index with an indication of how many instructions can issue in the next clock cycle.

27. The method of claim 26 where N is an integer multiple of M.

28. The method of claim 26, wherein the pointing to the instruction that will first issue is achieved by using an instruction rotator.

29. The method of claim 26 wherein the method is achieved in a superscalar pipeline.

30. The method of claim 29, wherein the method is achieved in the superscalar pipeline which issues a variable number of fixed length instructions in the next clock cycle.

31. The method of claim 26 wherein the method is achieved in a scalar pipeline.

32. The method of claim 31, wherein the method is achieved in the scalar pipeline which issues a fixed number of variable length instructions in the next clock cycle.

33. The method of claim 26, wherein the generating of the indication includes generating a plurality of bits for the representative sets.

34. A method of determining how instructions can issue in a next clock cycle comprising:

fetching N instructions;

decoding statically N sets of M contiguous, fetched instructions to generate an indication of how many of the M instructions in each respective set can issue in the next clock cycle; and indexing a pointer to a decoded instruction that will issue first in the next clock cycle.

35. The method of claim 34 where N is an integer multiple of M.

36. The method of claim 34, wherein the indexing a pointer is achieved by an index generator coupled to receive indications from decoded instructions.

37. The method of claim 34 wherein the method is achieved in a superscalar pipeline.

38. The method of claim 37, wherein the method is achieved in the superscalar pipeline which issues a variable number of fixed length instructions in the next clock cycle.

39. The method of claim 34 wherein the method is achieved in a scalar pipeline.

40. The method of claim 39, wherein the method is achieved in the scalar pipeline which issues a fixed number of variable length instructions in the next clock cycle.

41. The method of claim 34, wherein the decoding further includes generating a plurality of bits for use in indexing.

* * * * *